US008751568B1

(12) United States Patent
Mears

(10) Patent No.: US 8,751,568 B1
(45) Date of Patent: Jun. 10, 2014

(54) SYSTEMS AND METHODS FOR DATA LOSS PREVENTION

(75) Inventor: John Mears, Oxfordshire (GB)

(73) Assignee: Symantec Corporation, Mountain View, CA (US)

( * ) Notice: Subject to any disclaimer, the term of this patent is extended or adjusted under 35 U.S.C. 154(b) by 138 days.

(21) Appl. No.: 13/372,118

(22) Filed: Feb. 13, 2012

(51) Int. Cl.
*G06F 15/16* (2006.01)

(52) U.S. Cl.
USPC .......... 709/203; 709/204; 709/205; 709/206; 709/207; 709/208; 709/209; 709/210; 709/211

(58) Field of Classification Search
USPC ................................. 709/203–211
See application file for complete search history.

(56) References Cited

U.S. PATENT DOCUMENTS

| 2002/0184363 | A1* | 12/2002 | Viavant et al. | 709/224 |
| 2008/0184102 | A1* | 7/2008 | Selig | 715/234 |
| 2012/0023377 | A1* | 1/2012 | Garskof | 714/48 |
| 2012/0096546 | A1* | 4/2012 | Dilley et al. | 726/22 |

OTHER PUBLICATIONS

Websense—Essential Information Protection; Websense Web Security Gateway: Integrating the Content Gateway Component with Third party Data Loss Prevention Applications; Nov. 2010.

* cited by examiner

*Primary Examiner* — Wing F Chan
*Assistant Examiner* — Padma Mundur
(74) *Attorney, Agent, or Firm* — ALG Intellectual Property, LLC

(57) ABSTRACT

A computer-implemented method for data loss prevention may include 1) identifying a hypertext-transfer-protocol POST request from a client system to a hypertext-transfer-protocol server, 2) identifying metadata relating to the hypertext-transfer-protocol POST request differentiating at least one user-editable field within the hypertext-transfer-protocol POST request from at least one non-user-edited field within the hypertext-transfer-protocol POST request, 3) subjecting the user-editable field, based on the metadata, to a data-loss-prevention analysis and omitting the non-user-edited field from the data-loss-prevention analysis, and 4) performing a data-loss-prevention action based on the data-loss-prevention analysis. Various other methods, systems, and computer-readable media are also disclosed.

20 Claims, 6 Drawing Sheets

SYSTEMS AND METHODS FOR DATA LOSS PREVENTION

BACKGROUND

In the information age, individuals and organizations may quickly and easily share, access, and disseminate high volumes of digital information. For many individuals and organizations, the ease with which information may be electronically disseminated is empowering. However, the ubiquity of high-speed Internet access via a variety of computing devices may pose unique challenges for individuals and organizations concerned with preventing the loss and/or exposure of sensitive data. Individuals and organizations are therefore increasingly looking to data loss prevention ("DLP") solutions to protect their sensitive data.

Traditional DLP systems may use proxies to intercept and scan outgoing data to prevent sensitive data from leaving local protected networks into the wider Internet. Unfortunately, the high volume of network traffic common in modern environments may place a significant strain on computing resources as traditional DLP systems scan all data that passes through proxies. Furthermore, DLP systems may scan irrelevant data and thereby increase the chances of false positives while wasting misdirected computing resources. Accordingly, the instant disclosure identifies and addresses a need for additional and improved systems and methods for data loss prevention.

SUMMARY

As will be described in greater detail below, the instant disclosure generally relates to systems and methods for data loss prevention by scanning only data in user-edited and/or user-editable fields in form submissions while skipping data in other fields. In one example, a computer-implemented method for data loss prevention may include 1) identifying a hypertext-transfer-protocol POST request from a client system to a hypertext-transfer-protocol server, 2) identifying metadata relating to the hypertext-transfer-protocol POST request differentiating at least one user-editable field within the hypertext-transfer-protocol POST request from at least one non-user-edited field within the hypertext-transfer-protocol POST request, 3) subjecting the user-editable field, based on the metadata, to a data-loss-prevention analysis and omitting the non-user-edited field from the data-loss-prevention analysis, and 4) performing a data-loss-prevention action based on the data-loss-prevention analysis.

In some examples, identifying the hypertext-transfer-protocol POST request may include intercepting the hypertext-transfer-protocol POST request on a proxy system configured to perform data-loss-prevention for at least the client system. In some embodiments, identifying the metadata may include identifying the metadata within the hypertext-transfer-protocol POST request. In these embodiments, identifying the metadata may include identifying the metadata within at least one hidden field of the hypertext-transfer-protocol POST request.

In one example, the computer-implemented method may also include 1) receiving, from the hypertext-transfer-protocol server, a web form for the client and 2) injecting a script into a web page including the web form, the script being configured to generate the metadata relating to the hypertext-transfer-protocol POST request. In this example, the script may be configured to generate the metadata by scanning the web page for at least one of 1) user-editable fields and 2) non-user-editable fields. Additionally or alternatively, the script may be configured to generate the metadata by tracking the web page for modification to fields.

In some embodiments, performing the data-loss-prevention action may include at least one of 1) blocking the hypertext-transfer-protocol POST request from reaching the hypertext-transfer-protocol server and 2) redacting the user-editable field from the hypertext-transfer-protocol POST request. Additionally or alternatively, performing the data-loss-prevention action may include 1) removing the metadata from the hypertext-transfer-protocol POST request by removing a field including the metadata from the hypertext-transfer-protocol POST request and 2) forwarding the hypertext-transfer-protocol POST request to the hypertext-transfer-protocol server after removing the metadata.

In one embodiment, a system for implementing the above-described method may include 1) an identification module programmed to identify a hypertext-transfer-protocol POST request from a client system to a hypertext-transfer-protocol server, 2) a metadata module programmed to identify metadata relating to the hypertext-transfer-protocol POST request differentiating at least one user-editable field within the hypertext-transfer-protocol POST request from at least one non-user-edited field within the hypertext-transfer-protocol POST request, 3) an analysis module programmed to subject the user-editable field, based on the metadata, to a data-loss-prevention analysis and omitting the non-user-edited field from the data-loss-prevention analysis, and 4) a performing module programmed to perform a data-loss-prevention action based on the data-loss-prevention analysis. The system may also include at least one processor configured to execute the identification module, the metadata module, the analysis module, and the performing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a hypertext-transfer-protocol POST request from a client system to a hypertext-transfer-protocol server, 2) identify metadata relating to the hypertext-transfer-protocol POST request differentiating at least one user-editable field within the hypertext-transfer-protocol POST request from at least one non-user-edited field within the hypertext-transfer-protocol POST request, 3) subject the user-editable field, based on the metadata, to a data-loss-prevention analysis and omitting the non-user-edited field from the data-loss-prevention analysis, and 4) perform a data-loss-prevention action based on the data-loss-prevention analysis.

As will be explained in greater detail below, by scanning only data in user-edited and/or user-editable fields in form submissions while skipping data in other fields, the systems and methods described herein may reduce the number of false positives generated by data-loss-prevention scans of form submissions (e.g., by scanning less data) while still scanning all relevant data (e.g., data supplied by a user). Accordingly, these systems and methods may improve the accuracy of data-loss-prevention scans and/or potentially consume fewer computing resources by scanning less data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
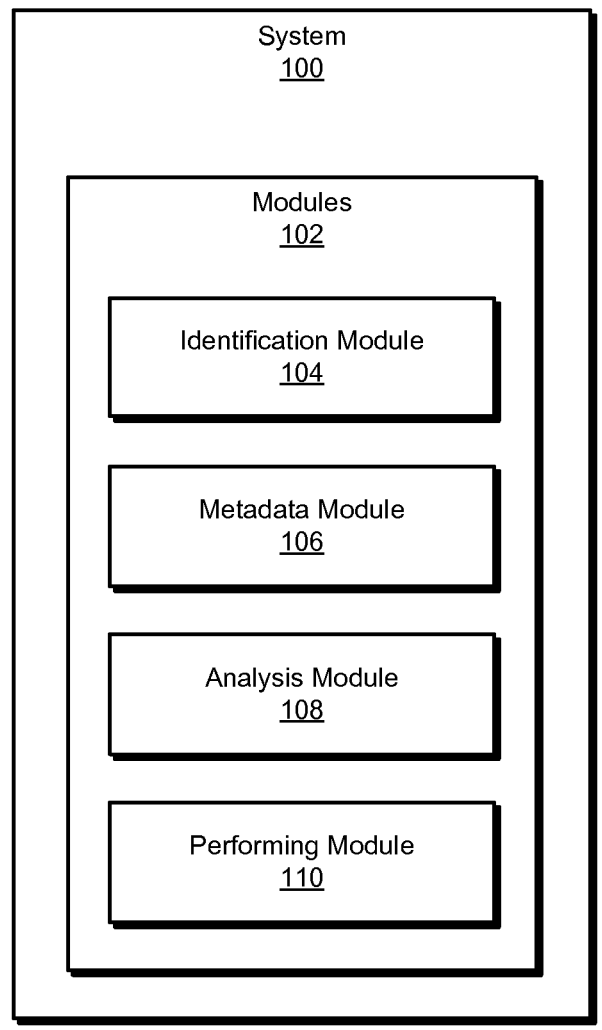
FIG. 1 is a block diagram of an exemplary system for data loss prevention.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
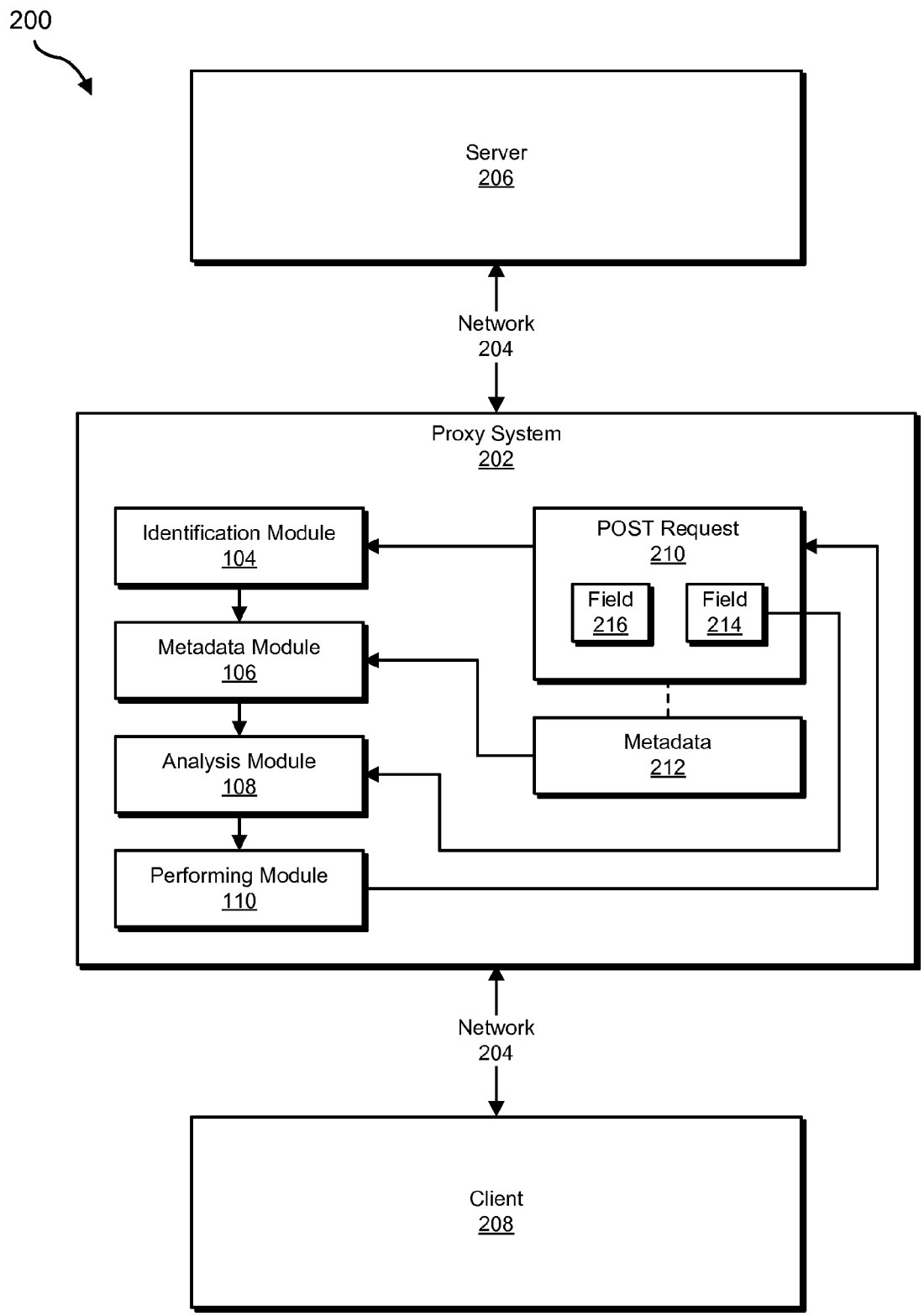
FIG. 2 is a block diagram of an exemplary system for data loss prevention.
Figure 3:
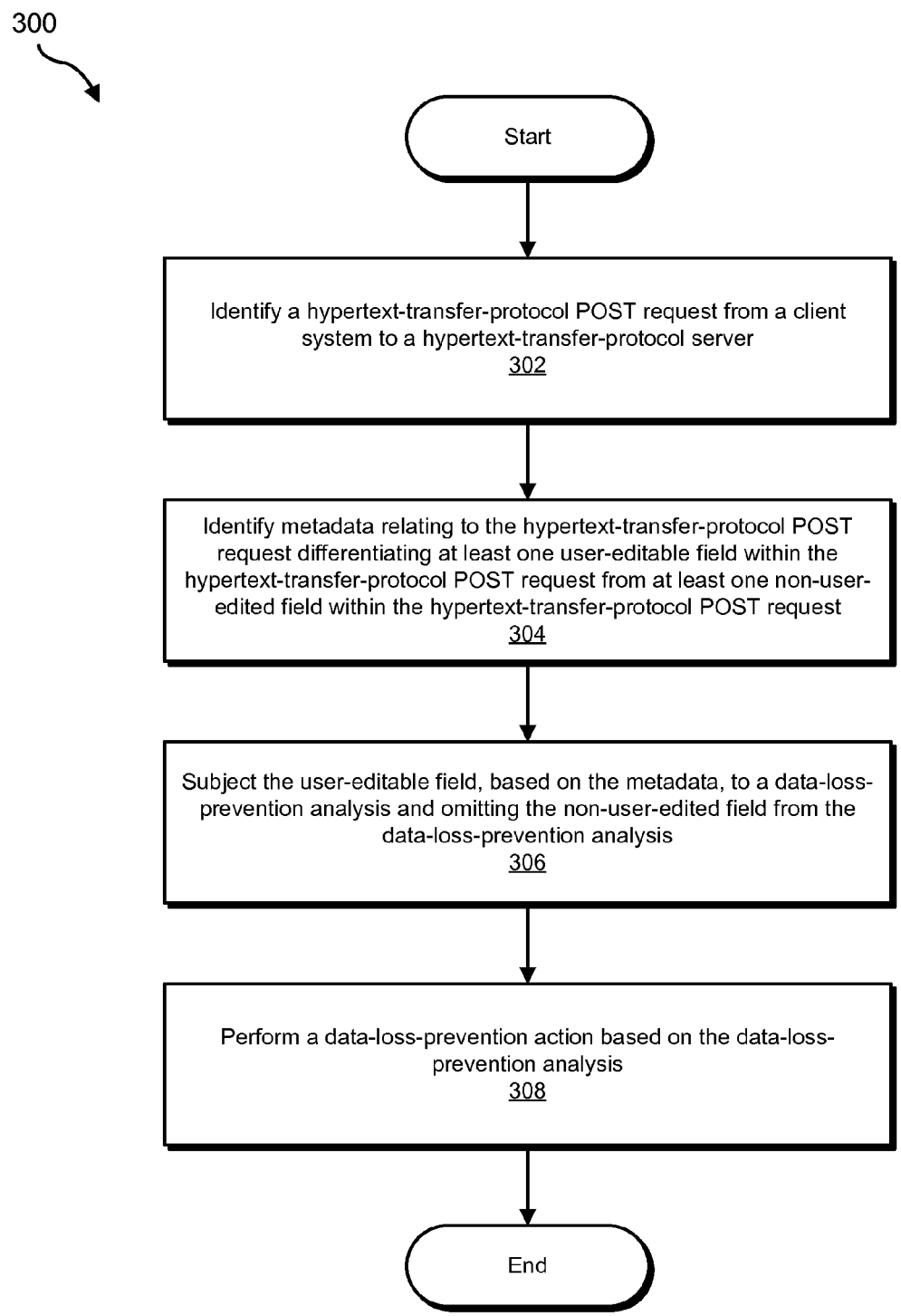
FIG. 3 is a flow diagram of an exemplary method for data loss prevention.
Figure 4:
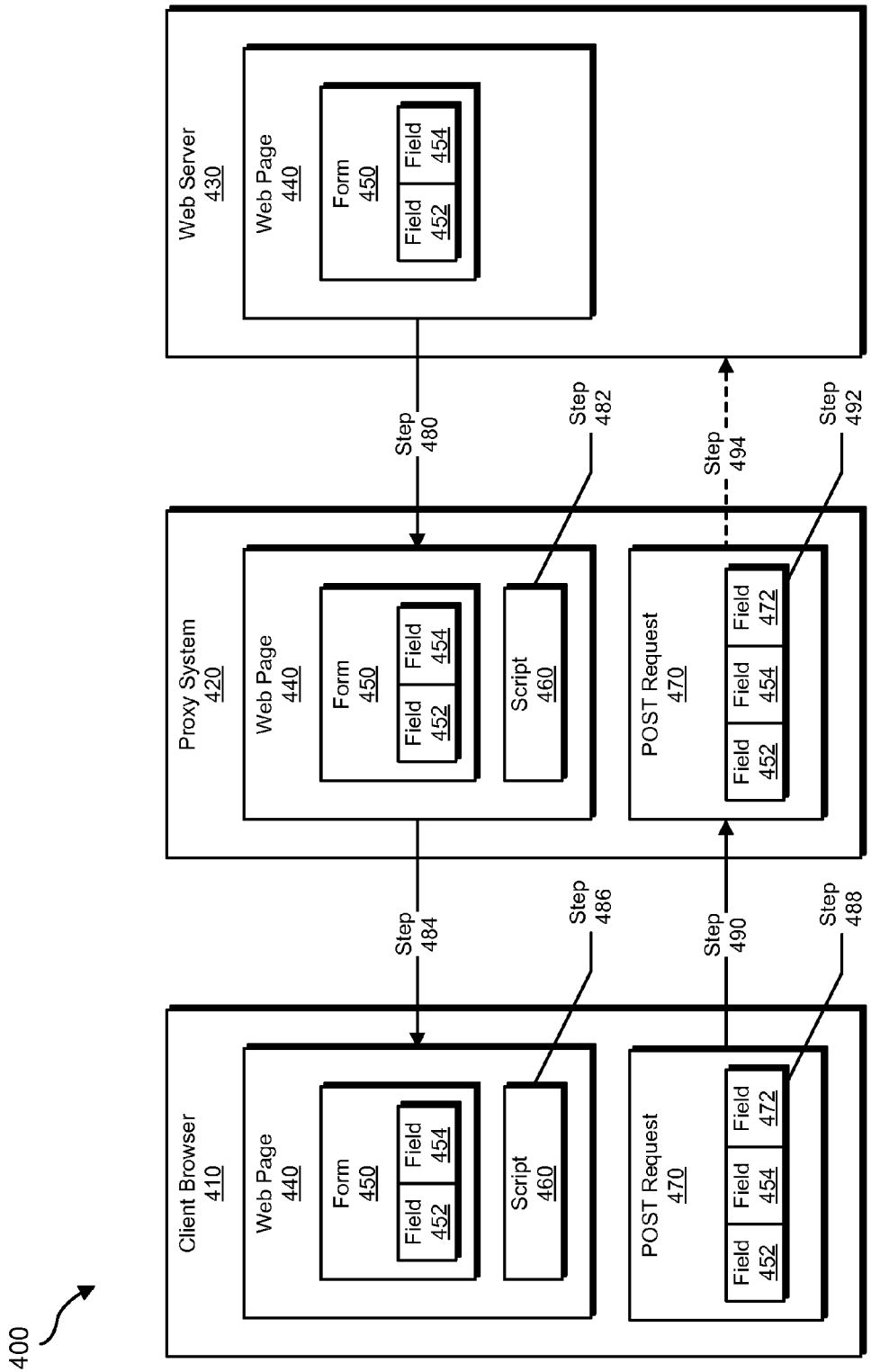
FIG. 4 is a block diagram of an exemplary system for data loss prevention.

The following will provide, with reference to FIGS. 1, 2, and 4, detailed descriptions of exemplary systems for data loss prevention. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for data loss prevention. As illustrated in this figure, exemplary system 100 may include one or more modules 102 for performing one or more tasks. For example, and as will be explained in greater detail below, exemplary system 100 may include an identification module 104 programmed to identify a hypertext-transfer-protocol POST request from a client system to a hypertext-transfer-protocol server. Exemplary system 100 may also include a metadata module 106 programmed to identify metadata relating to the hypertext-transfer-protocol POST request differentiating at least one user-editable field within the hypertext-transfer-protocol POST request from at least one non-user-edited field within the hypertext-transfer-protocol POST request.

In addition, and as will be described in greater detail below, exemplary system 100 may include an analysis module 108 programmed to subject the user-editable field, based on the metadata, to a data-loss-prevention analysis and omitting the non-user-edited field from the data-loss-prevention analysis.

Exemplary system 100 may also include a performing module 110 programmed to perform a data-loss-prevention action based on the data-loss-prevention analysis. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., proxy system 202, server 206, and/or client 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a proxy system 202 in communication with a server 206 and a client 208 via a network 204.

In one embodiment, one or more of modules 102 from FIG. 1 may, when executed by at least one processor of proxy system 202, facilitate proxy system 202 in data loss prevention. For example, and as will be described in greater detail below, one or more of modules 102 may cause proxy system 202 to 1) identify a POST request 210 from client 208 to server 206, 2) identify metadata 212 relating to POST request 210 differentiating a field 214 within POST request 210 being user-editable from field 216 within POST request 210 being non-user-edited, 3) subject the user-editable field 214, based on metadata 212, to a data-loss-prevention analysis and omitting the non-user-edited field 216 from the data-loss-prevention analysis, and 4) perform a data-loss-prevention action (e.g., relating to POST request 210) based on the data-loss-prevention analysis.

Proxy system 202 generally represents any type or form of computing device capable of reading computer-executable instructions and processing network communications. Examples of proxy system 202 include, without limitation, proxy appliances, application servers configured to run proxy software applications, and proxy modules.

Server 206 generally represents any type or form of computing device that is capable of providing Internet documents and/or services, receiving POST requests, and/or receiving sensitive data from client systems. Examples of server 206 include, without limitation, application servers and database servers configured to provide various database services and/or run certain software applications.

Client 208 generally represents any type or form of computing device capable of reading computer-executable instructions. Examples of client 208 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between proxy system 202 and server 206 and/or proxy system 202 and client 208.

FIG. 3 is a flow diagram of an exemplary computer-implemented method 300 for data loss prevention. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a hypertext-transfer-protocol POST request from a client system to a hypertext-transfer-protocol server. For example, at step 302 identification module 104 may, as part of proxy system 202 in FIG. 2, identify a POST request 210 from client 208 to server 206.

As used herein, the phrase "hypertext transfer protocol" may refer to any Internet protocol that defines one or more request methods to request an action from and/or communicate with a server (e.g., regarding one or more resources). Accordingly, the phrase "hypertext transfer protocol" may refer to a version of the Hypertext Transfer Protocol, an extension to the Hypertext Transfer Protocol, a successor to the Hypertext Transfer Protocol, an alternative to the Hypertext Transfer Protocol, and/or an analogue to the Hypertext Transfer Protocol.

In addition, the phrase "POST request" may refer to any request, message, and/or communication configured to transmit one or more fields of data to a server. For example, a POST request may include one or more fields of data specified in and/or submitted via a hypertext-transfer-protocol form. In some examples, the phrase "POST request" may refer to an analogue, alternative, and/or successor to a Hypertext Transfer Protocol POST request. For example, the phrase "POST request" may refer to a communication of MIME type "multipart/form-data" (e.g., in a Hypertext Transfer Protocol communication).

As used herein, the phrase "client system" may refer to any system capable of submitting a POST request to a hypertext-transfer-protocol server. Likewise, the phrase "hypertext-transfer-protocol server" may refer to any system capable of receiving a POST request from a client system. In some examples, the phrase "client system" may refer to a personal computing system (e.g., a desktop, a mobile computing device, etc.). Additionally or alternatively, the phrase "client system" may refer to a client application (e.g., a web browser).

Identification module 104 may identify the hypertext-transfer-protocol POST request in any suitable context. For example, identification module 104 may identify the hypertext-transfer-protocol POST request by intercepting the hypertext-transfer-protocol POST request on a proxy system configured to perform data-loss-prevention for at least the client system. In some examples, the proxy system may be configured to intercept network traffic from the client system. For example, the proxy system may be configured to intercept all network traffic from the client system, network traffic from the client system destined to an external network, network traffic from the client system leaving a protected network, network traffic from certain applications on the client system, etc. In some examples, the proxy system may operate independently from the client system (e.g., on a separate computing device).

FIG. 4 illustrates an exemplary system 400 for data loss prevention. As shown in FIG. 4, exemplary system 400 may include a client browser 410, a proxy system 420, and a web server 430. Using FIG. 4 as an example, at step 302 identification module 104 may, as a part of proxy system 420, identify a POST request 470 from client browser 410 and directed to web server 430. For example, at step 490 client browser 410 may attempt to send POST request 470 to web server 430 and proxy system 420 may intercept POST request 470.

Returning to FIG. 3, at step 304 one or more of the systems described herein may identify metadata relating to the hypertext-transfer-protocol POST request differentiating at least one user-editable field within the hypertext-transfer-protocol POST request from at least one non-user-edited field within the hypertext-transfer-protocol POST request. For example, at step 304 metadata module 106 may, as part of proxy system 202 in FIG. 2, identify metadata 212 relating to POST request 210 differentiating a field 214 within POST request 210 being user-editable from field 216 within POST request 210 being non-user-edited.

As used herein, the term "field" may refer to any data element transferred by a POST request. In some examples, a field may correspond to a web form. For example, a web form may include a text field and/or input fields of other formats for submitting data via POST requests. In some examples, a field may be user-editable. For example, a web form may allow a user to change a value within a field (e.g., adding text to a text field). Alternatively, a field may be user-editable but non-user-edited (e.g., allowing a user to change a value within the field, but submitted without the value having changed). Alternatively, a field may be non-user-editable and/or non-user-edited. In some examples, a field may be hidden (e.g., not visible to a user on a rendered web page containing the web form).

Metadata module 106 may identify the metadata in any suitable manner. For example, metadata module 106 may receive a communication separately from the POST request that includes the metadata. Additionally or alternatively, metadata module 106 may identify the metadata within the hypertext-transfer-protocol POST request. For example, the metadata may appear as a comment within a MIME message. Additionally or alternatively, metadata module 106 may identify the metadata within at least one hidden field of the hypertext-transfer-protocol POST request. As will be explained in greater detail below, a script previously injected into a web page containing a web form may have generated the hidden field to add to the POST request.

Using FIG. 4 as an example, at step 304 metadata module 106 may identify the metadata within POST request 470. For example, at step 492 metadata module 106 may, as a part of proxy system 420, identify the metadata differentiating the user-edited and/or -editable statuses of fields 452 and 454 within a field 472.

As mentioned earlier, in some examples one or more of the systems described herein may have previously generated and/or created and injected a script to generate the metadata in the POST request. For example, a receiving module may receive, from the hypertext-transfer-protocol server, a web form for the client. An injection module may then inject a script into a web page including the web form, the script being configured to generate the metadata relating to the hypertext-transfer-protocol POST request.

As used herein, the phrase "web page" may refer to any Internet document and/or resource capable of including a web form and/or a script. In addition, the phrase "web form" may refer to any element and/or collection of elements of a web page that includes fields and/or is capable of generating, submitting, and/or contributing values to a POST request. Additionally, the term "script" may refer to any instructions, commands, and/or operations that may be included in a web page. For example, the script may include a JAVASCRIPT script.

Using FIG. 4 as an example, web server 430 may, at step 480, attempt to transmit a web page 440 to client browser 410 (e.g., after receiving a request for web page 440 from client browser 410 via proxy system 420) and a receiving module may, as a part of proxy system 420, receive web page 440 on behalf of client browser 410. At step 482, an injection module may, as a part of proxy system 420, inject a script 460 into web page 440.

In some examples, the script may be configured to generate the metadata by scanning the web page for user-editable fields and/or for non-user-editable fields (or, e.g., fields that are hidden versus fields that are not hidden). In these examples, the script may parse the web form within the web page and then generate a list of fields that are user-editable and/or a list of fields that are non-user-editable. Additionally or alternatively, the script may be configured to generate the metadata by monitoring the web page for user-edited fields. For example, the script may be configured to generate the metadata by tracking the web page for modifications to fields. Additionally or alternatively, the script may be configured to track the web page for potential modifications to fields (e.g., by detecting user focus on fields). In these examples, the script may thereby generate a list of fields that are user-edited and/or a list of fields that are non-user-edited.

Using FIG. 4 as an example, at step 484 proxy system 420 may forward web page 440 injected with script 460 to client browser 410. At step 486, script 460 may run, differentiating fields 452 and 454 according to whether or not they are user-edited and/or -editable. For example, script 460 may determine that field 452 is user-edited and field 454 is non-user-edited. Script 460 may accordingly generate metadata describing the differentiation and, at step 488, include the metadata as a hidden field 472 in POST request 470. As described earlier, at step 490 a user may submit form 450 resulting in client browser 410 sending POST request 470 to proxy system 420.

Returning to FIG. 3, at step 306 one or more of the systems described herein may subject the user-editable field, based on the metadata, to a data-loss-prevention analysis and omitting the non-user-edited field from the data-loss-prevention analysis. For example, at step 306 analysis module 108 may, as part of proxy system 202 in FIG. 2, subject the user-editable field 214, based on metadata 212, to a data-loss-prevention analysis and omitting the non-user-edited field 216 from the data-loss-prevention analysis.

As used herein, the phrase "data-loss-prevention analysis" may refer to any analysis and/or scan performed to identify sensitive information by applying one or more rules and/or heuristics to data (e.g., to determine the disposition of the data in various scenarios).

Analysis module 108 may subject the user-editable field to the data-loss-prevention analysis in any suitable manner. For example, analysis module 108 may determine, from the metadata, that the user-editable field is user-editable and/or user-edited and then, based on the determination, forward the user-editable field (e.g., along with any relevant contextual information) to a data-loss-prevention engine. Additionally or alternatively, analysis module 108 may operate as a part of a data-loss-prevention engine and apply a data-loss-prevention policy to the user-editable field. Likewise, analysis module 108 may omit analysis of the non-user-edited field upon determining from the metadata that the non-user-edited field is non-user-edited and/or non-user-editable.

Using FIG. 4 as an example, at step 492 analysis module 108 may, as a part of proxy system 420, parse field 472 for information on whether each of fields 452 and 454 are user-edited or non-user-edited. For example, analysis module 108 may determine that field 452 is user-edited and subject the contents of field 452 to a data-loss-prevention analysis. Analysis module 108 may further determine that field 454 is non-user-edited and skip any data-loss-prevention analysis of field 454.

Returning to FIG. 3, at step 308 one or more of the systems described herein may perform a data-loss-prevention action based on the data-loss-prevention analysis. For example, at step 308 performing module 110 may, as part of proxy system 202 in FIG. 2, perform a data-loss-prevention action (e.g., relating to POST request 210) based on the data-loss-prevention analysis.

Performing module 110 may perform any of a variety of data-loss-prevention actions based on the data-loss-prevention analysis. For example, performing module 110 may block the hypertext-transfer-protocol POST request from reaching the hypertext-transfer-protocol server. Additionally or alternatively, performing module 110 may redact the user-editable field from the hypertext-transfer-protocol POST request. For example, performing module 110 may remove sensitive portions of the user-editable field and/or remove the user-editable field entirely from the hypertext-transfer-protocol POST request. In some examples, performing module 110 may send a report of a data-loss-prevention policy violation to an administrator. Additionally or alternatively, performing module 110 may send a warning to a user that submitted the POST request (e.g., responding to the POST request with a web page containing a warning that the user may have violated a data-loss-prevention policy and/or that the POST request was blocked and/or modified). In additional examples, performing module 110 may block the client from further communications with the hypertext-transfer-protocol server, disable the client and/or a portion of the client (e.g., a web browser on the client), block outgoing network connections from the client, and/or increase the sensitivity, severity, and/or thoroughness of data-loss-prevention scans for data associated with a responsible user and/or for POST requests from the responsible user.

In some examples, the data-loss-prevention analysis may determine that the user-edited field is in compliance with all data-loss-prevention policies. In these examples, performing module 110 may perform a data-loss-prevention action by allowing the POST request to proceed. For example, performing module 110 may remove the metadata from the hypertext-transfer-protocol POST request by removing a field including the metadata from the hypertext-transfer-protocol POST request and then forwarding the hypertext-transfer-protocol POST request to the hypertext-transfer-protocol server after removing the metadata. In this manner, performing module 110 may restore the POST request to an original expected state (e.g., as if the POST request had never been interfered with by an injected script, etc.). Using FIG. 4 as an example, at step 494 performing module 110 may, as a part of proxy system 420, remove field 472 from POST request 470 and then forward POST request 470 to web server 430.

As explained above, by scanning only data in user-edited and/or user-editable fields in form submissions while skipping data in other fields, the systems and methods described herein may reduce the number of false positives generated by data-loss-prevention scans of form submissions (e.g., by scanning less data) while still scanning all relevant data (e.g., data supplied by a user). Accordingly, these systems and methods may improve the accuracy of data-loss-prevention scans and/or potentially consume fewer computing resources by scanning less data.

Figure 5:
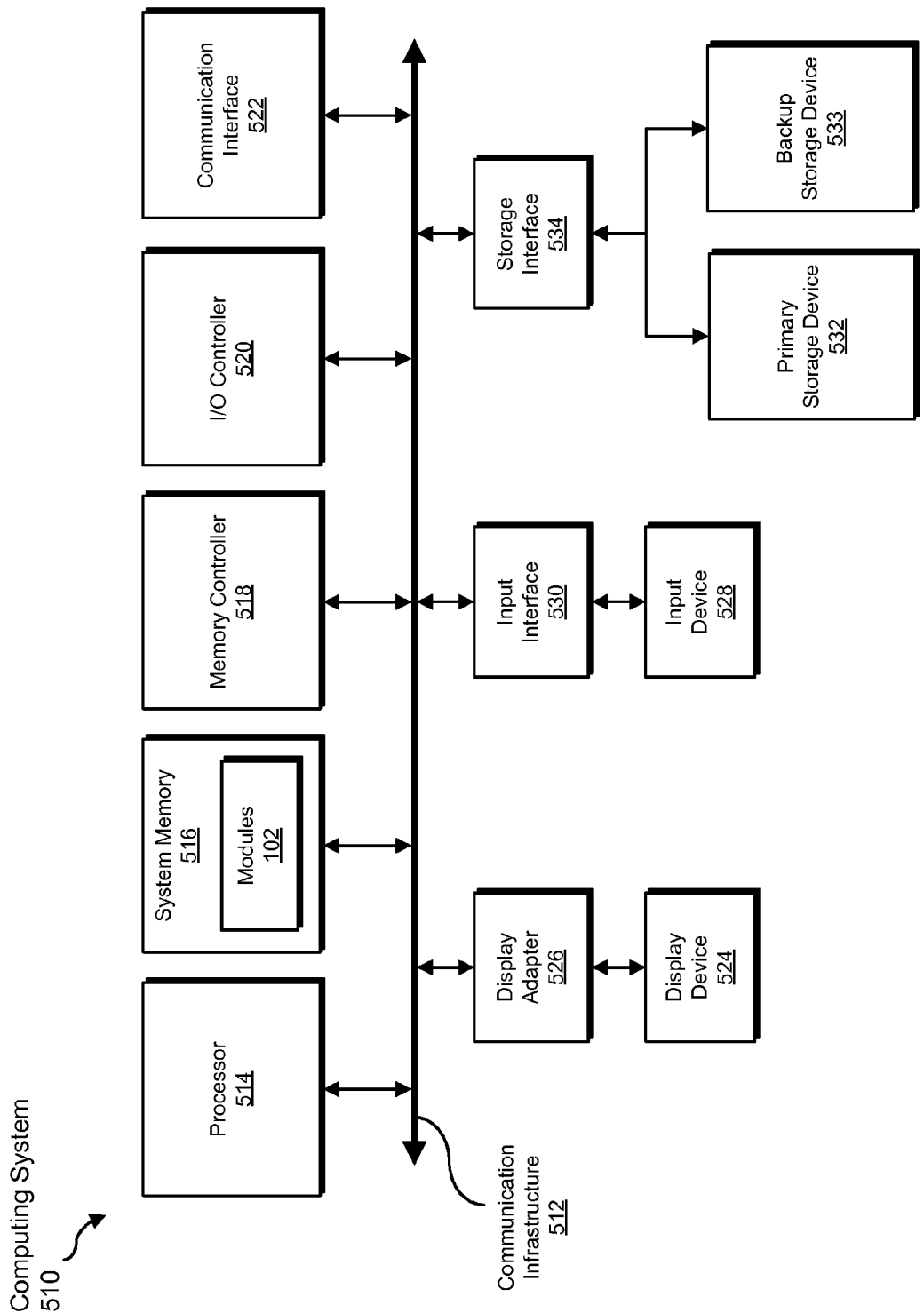
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, receiving, injecting, generating, subjecting, performing, blocking, redacting, removing, and forwarding steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
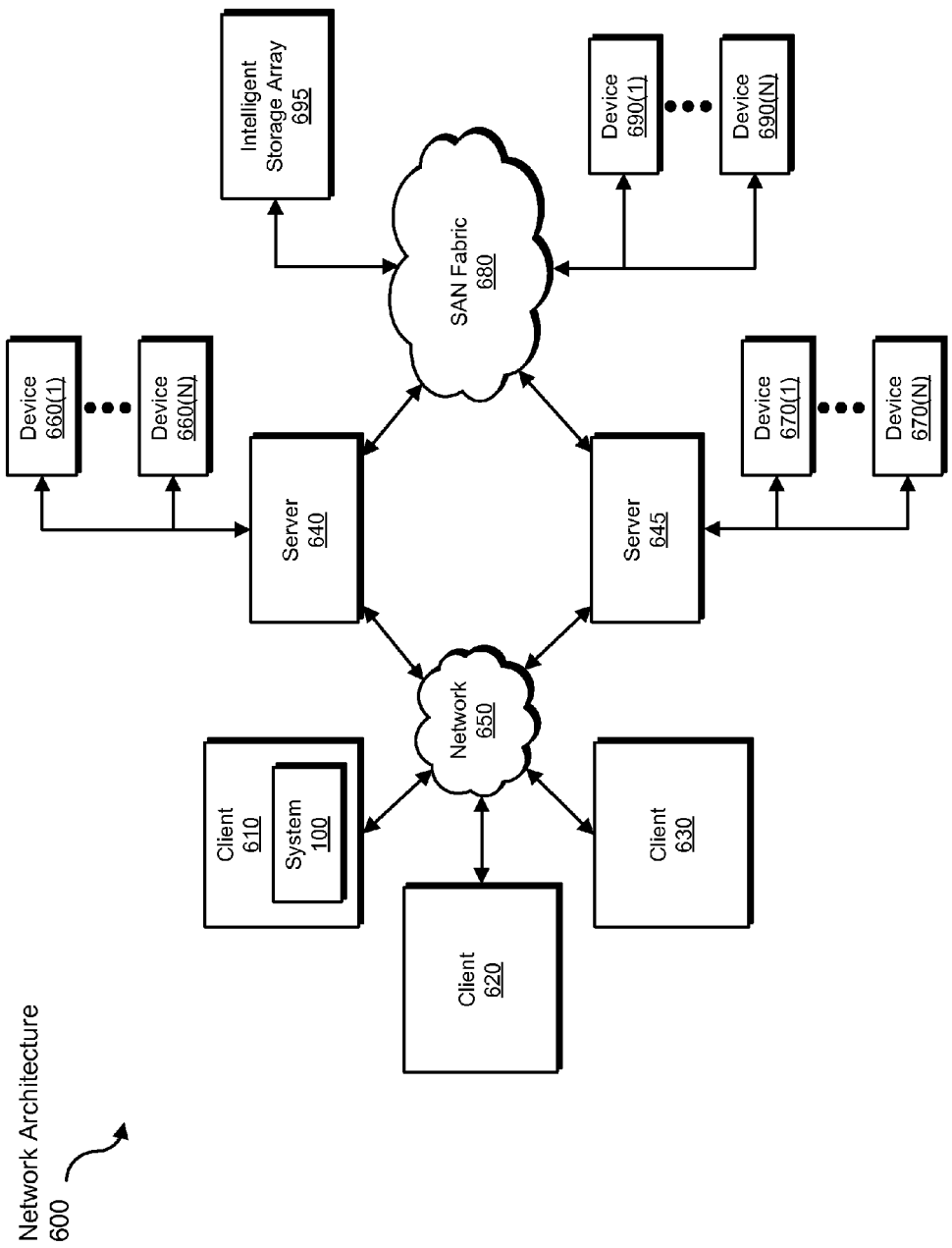
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, receiving, injecting, generating, subjecting, performing, blocking, redacting, removing, and forwarding steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for data loss prevention.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for data loss prevention. As another example, one or more of the modules recited herein may transform an HTTP POST request into an HTTP POST request for facilitating efficient and/or accurate data loss prevention.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for data loss prevention, at least a portion of the method being performed by a proxy system comprising at least one processor, the method comprising:
  receiving, at the proxy system from a hypertext-transfer-protocol server, a web page comprising a web form for a client system;
  injecting, at the proxy system, a script into the web page that:
    scans the web page for at least one of user-editable fields and non-user-editable fields;
    generates and stores custom metadata within the web page that:
      marks user-editable fields within the web page as being subject to data-loss-prevention analysis;
      marks non-user-editable fields within the web page as not being subject to data-loss-prevention analysis;
  identifying, at the proxy system, a hypertext-transfer-protocol POST request issued in connection with the web form by the client system to the hypertext-transfer-protocol server;
  identifying, at the proxy system, the custom metadata within the hypertext-transfer-protocol POST request that was generated by the script;
  subjecting, based on the custom metadata identified at the proxy system, the user-editable field to a data-loss-prevention analysis and omitting the non-user-editable field from the data-loss-prevention analysis;
  removing, at the proxy system, the custom metadata from the hypertext-transfer-protocol POST;
  performing, at the proxy system, a data-loss-prevention action based on the data-loss-prevention analysis by blocking the user-editable field from reaching the hypertext-transfer-protocol server.

2. The computer-implemented method of claim 1, wherein the script generates the custom metadata by:
  creating at least one hidden field within the hypertext-transfer-protocol POST request;
  storing the custom metadata within the hidden field of the hypertext-transfer-protocol POST request.

3. The computer-implemented method of claim 2, wherein identifying the custom metadata within the hypertext-transfer-protocol POST request comprises identifying the custom metadata within the hidden field of the hypertext-transfer-protocol POST request.

4. The computer-implemented method of claim 1, wherein identifying the hypertext-transfer-protocol POST request comprises intercepting the hypertext-transfer-protocol POST request on the proxy system.

5. The computer-implemented method of claim 1, wherein receiving the web page comprises intercepting the web page on the proxy system.

6. The computer-implemented method of claim 1, wherein the custom metadata comprises at least one of:
  a comment on a user-editable field;

a portion of content from a user-editable field;
a comment on a non-user-edited field;
a portion of content from a non-user-edited field.

7. The computer-implemented method of claim 1, wherein the script generates the custom metadata by tracking the web page for modifications to the user-editable fields.

8. The computer-implemented method of claim 1, wherein blocking the user-editable field from reaching the hypertext-transfer-protocol server comprises at least one of:
blocking the hypertext-transfer-protocol POST request from reaching the hypertext-transfer-protocol server;
redacting the user-editable field from the hypertext-transfer-protocol POST request.

9. The computer-implemented method of claim 1, wherein removing the custom metadata from the hypertext-transfer-protocol POST comprises removing a field comprising the custom metadata from the hypertext-transfer-protocol POST request before the hypertext-transfer-protocol POST request is forwarded to the hypertext-transfer-protocol server.

10. A system for data loss prevention, the system comprising:
a proxy system that comprises both memory and at least one processor;
a receiving module, stored in the memory of the proxy system, that receives, from a hypertext-transfer-protocol server, a web page comprising a web form for a client system;
an injection module, stored in the memory of the proxy system, that injects a script into the web page that:
scans the web page for at least one of user-editable fields and non-user-editable fields:
generates custom metadata for the web page that:
marks user-editable fields within the web page as being subject to data-loss-prevention analysis;
marks non-user-editable fields within the web page as not being subject to data-loss-prevention analysis;
an identification module, stored in the memory of the proxy system, that identifies a hypertext-transfer-protocol POST request issued in connection with the web from by the client system to the hypertext-transfer-protocol server;
a metadata module, stored in the memory of the proxy system, that:
identifies, within the hypertext-transfer-protocol POST request, the custom metadata generated by the script;
removes the custom metadata from the hypertext-transfer-protocol POST;
an analysis module, stored in the memory of the proxy system, that subjects, based on the custom metadata, the user-editable field to a data-loss-prevention analysis and omits the non-user-editable field from the data-loss-prevention analysis;
a performing module, stored in the memory of the proxy system, that performs a data-loss-prevention action based on the data-loss-prevention analysis by blocking the user-editable field from reaching the hypertext-transfer-protocol server.

11. The system of claim 10, wherein the script generates the custom metadata by:
creating at least one hidden field within the hypertext-transfer-protocol POST request;
storing the custom metadata within the hidden field of the hypertext-transfer-protocol POST request.

12. The system of claim 11, wherein the metadata module identifies the custom metadata within the hypertext-transfer-protocol POST request by identifying the custom metadata within the hidden field of the hypertext-transfer-protocol POST request.

13. The system of claim 10, wherein the identification module identifies the hypertext-transfer-protocol POST request by intercepting the hypertext-transfer-protocol POST request on the proxy system.

14. The system of claim 10, wherein the receiving module receives the web page by intercepting the web page on the proxy system.

15. The system of claim 10, wherein the custom metadata comprises at least one of:
a comment on a user-editable field;
a portion of content from a user-editable field;
a comment on a non-user-edited field;
a portion of content from a non-user-edited field.

16. The system of claim 10, wherein the script generates the custom metadata by tracking the web page for modifications to the user-editable fields.

17. The system of claim 10, wherein the performing module blocks the user-editable field from reaching the hypertext-transfer-protocol server by at least one of:
blocking the hypertext-transfer-protocol POST request from reaching the hypertext-transfer-protocol server;
redacting the user-editable field from the hypertext-transfer-protocol POST request.

18. The system of claim 10, wherein the metadata module removes the custom metadata from the hypertext-transfer-protocol POST by removing a field comprising the custom metadata from the hypertext-transfer-protocol POST request before the hypertext-transfer-protocol POST request is forwarded to the hypertext-transfer-protocol server.

19. A non-transitory computer-readable-storage medium comprising one or more computer-executable instructions that, when executed by at least one processor of a proxy system, cause the proxy system to:
receive, at the proxy system from a hypertext-transfer-protocol server, a web page comprising a web form for a client system;
inject, at the proxy system, a script into the web page that:
scans the web page for at least one of user-editable fields and non-user-editable fields;
generates custom metadata for the web page that:
marks user-editable fields within the web page as being subject to data-loss-prevention analysis;
marks non-user-editable fields within the web page as not being subject to data-loss-prevention analysis;
identify, at the proxy system, a hypertext-transfer-protocol POST request issued in connection with the web form by the client system to the hypertext-transfer-protocol server;
identify, at the proxy system, the custom metadata within the hypertext-transfer-protocol POST request that was generated by the script;
subject, at the proxy system based on the custom metadata, the user-editable field to a data-loss-prevention analysis and omit the non-user-editable field from the data-loss-prevention analysis;
remove, at the proxy system, the custom metadata from the hypertext-transfer-protocol POST;
perform, at the proxy system, a data-loss-prevention action based on the data-loss-prevention analysis by blocking the user-editable field from reaching the hypertext-transfer-protocol server.

20. The non-transitory computer-readable-storage medium of claim 19, wherein the one or more computer-executable instructions cause the proxy system to generate the custom metadata by:
    creating at least one hidden field within the hypertext-transfer-protocol POST request;
    storing the custom metadata within the hidden field of the hypertext-transfer-protocol POST request.

* * * * *

UNITED STATES PATENT AND TRADEMARK OFFICE
CERTIFICATE OF CORRECTION

| | |
|---|---|
| PATENT NO. | : 8,751,568 B1 |
| APPLICATION NO. | : 13/372118 |
| DATED | : June 10, 2014 |
| INVENTOR(S) | : Mears |

It is certified that error appears in the above-identified patent and that said Letters Patent is hereby corrected as shown below:

In the Claims

Claim 10, at column 15, lines 30 to 31, should read:

scans the web page for at least one of user-editable fields and non-user-editable fields;

Claim 10, at column 15, lines 37 to 41, should read:

an identification module, stored in the memory of the proxy system, that identifies a
hypertext-transfer-protocol POST request issued in connection with the web form by the client system
to the hypertext-transfer-protocol server;

Signed and Sealed this
Eleventh Day of November, 2014

Michelle K. Lee
*Deputy Director of the United States Patent and Trademark Office*